(12) United States Patent
Keller

(10) Patent No.: US 9,867,364 B2
(45) Date of Patent: Jan. 16, 2018

(54) TOP MEMBER FOR A TERRARIUM AND THE TERRARIUM ITSELF

(71) Applicant: Adam John Keller, Fremont, WI (US)

(72) Inventor: Adam John Keller, Fremont, WI (US)

(73) Assignee: Adam John Keller, Fremont, WI (US)

( * ) Notice: Subject to any disclaimer, the term of this patent is extended or adjusted under 35 U.S.C. 154(b) by 254 days.

(21) Appl. No.: 14/876,070

(22) Filed: Oct. 6, 2015

(65) Prior Publication Data

US 2017/0094954 A1    Apr. 6, 2017

(51) Int. Cl.
*A01K 63/00* (2017.01)

(52) U.S. Cl.
CPC ................... *A01K 63/006* (2013.01)

(58) Field of Classification Search
CPC .................................................. A01K 63/006
USPC .................................. 119/265, 269, 245–247
See application file for complete search history.

(56) References Cited

U.S. PATENT DOCUMENTS

| | | | |
|---|---|---|---|
| 3,711,133 A | | 1/1973 | Werner |
| 3,834,351 A | * | 9/1974 | Schmidt ................ A01K 63/06 119/266 |
| 3,854,831 A | | 12/1974 | Gutner |
| 4,299,508 A | | 11/1981 | Kerscher et al. |
| 4,323,319 A | | 4/1982 | Adams |
| 4,516,376 A | | 5/1985 | King |
| 5,328,049 A | * | 7/1994 | Ritzow ................ A01K 63/003 119/481 |
| 5,762,026 A | * | 6/1998 | Watters ................ A01K 63/003 119/246 |
| 5,832,871 A | * | 11/1998 | Leis ..................... A01K 63/003 119/265 |
| 6,029,604 A | * | 2/2000 | de Vosjoli ............. A01K 63/00 119/246 |
| 7,044,071 B2 | * | 5/2006 | Jordan ................. D05B 23/007 112/470.08 |
| 7,481,183 B2 | * | 1/2009 | Van Heygen ........ A01K 63/003 119/246 |
| 7,883,288 B2 | | 2/2011 | Jorna |
| 2007/0119113 A1 | * | 5/2007 | Keller .................. E06B 3/4663 52/506.01 |
| 2014/0116346 A1 | * | 5/2014 | Lutz ..................... A01K 63/003 119/269 |

(Continued)

OTHER PUBLICATIONS

Rocky Mountian, Quick Frame Technical Data, 2014, 3 pages, Westmill Industries, Canada.

*Primary Examiner* — Joshua D Huson
(74) *Attorney, Agent, or Firm* — Thomas J. Connelly; Northwind IP Law, S.C.

(57) ABSTRACT

A top member for a terrarium is disclosed along with the terrarium. The top member includes a frame member positioned around an upper periphery of the terrarium. The frame member contains a recess. A divider spans across the upper periphery of the terrarium. The top member also has a pair of brackets each having a first portion sized to fit into the recess of the frame member and a second portion secured to the divider by fasteners. The top member further has a pair of covers secured between the frame member and the divider which allow for the passage of air into and out of the terrarium. The top member also has a pair of attachment members each surrounding one of the pair of covers. The pair of attachment members engages with the frame member and the divider to hold the pair of covers secure.

20 Claims, 4 Drawing Sheets

(56) References Cited

U.S. PATENT DOCUMENTS

2017/0094953 A1* 4/2017 Keller .................. A01K 63/006

* cited by examiner

TOP MEMBER FOR A TERRARIUM AND THE TERRARIUM ITSELF

FIELD OF THE INVENTION

This invention relates to a top member for a terrarium and the terrarium itself.

BACKGROUND OF THE INVENTION

Today, many people keep exotic animals, especially reptiles, such as turtles and snakes, in terrariums located in their homes. Although such reptiles do not appeal to everyone, they do present a unique set of challenges to manufacturers of terrariums, cages, tanks and containers which house such creatures. Some terrariums must have both a dry area and a wet area with the dry area being free of water and the wet area containing some water. Most terrariums require good ventilation to allow fresh air to enter and exit the enclosure. In addition, some form of ingress and egress is also needed to allow the exotic animal to be inserted into or be removed from the enclosure, to insert food and water into the enclosure, and to periodically clean the enclosure. Furthermore, some snakes, in particular, can grow quiet large and have the ability to climb and push or exert a large force against the top member of the enclosure. Therefore, it is imperative that the top member be designed and constructed such that it cannot be pushed upward or else the reptile could escape.

Now, a top member for an existing terrarium has been invented, as well as a new terrarium, which will prevent an animal, such as a reptile, from pushing the top member upward and escaping.

SUMMARY OF THE INVENTION

Briefly, this invention relates to a top member for an existing terrarium, and to a new terrarium. In one embodiment, the top member includes a frame member positioned around an upper periphery of the terrarium. The frame member has a top wall joined by a sidewall to a bottom wall. The top wall has an inner edge with a first channel formed adjacent thereto. The first channel has a back wall and has an inwardly facing opening. The frame member also has a first wall extending downward toward the bottom wall. The first wall and the back wall create a recess therebetween. The top member also includes a divider. The divider has an upper wall with first and second side edges, a pair of sidewalls extending downward from the upper wall and each of the pair of sidewalls is spaced inward from one of the first and second side edges. The divider also has a pair of lower walls extending outward from the pair of sidewalls. Each of the pair of lower walls cooperates with the upper wall and the pair of sidewalls to create a second channel and a third channel. Each of the second and third channels has an outwardly facing opening. The top member further includes a pair of brackets each having a first portion and a second portion joined together by a fourth channel. Each of the pair of brackets also has a first side and a second side and the fourth channel extends between the first and second sides. The first portion of each of the pair of brackets is sized to fit in the recess of the frame member. Fasteners are used to secure the second portion of each of the pair of brackets to the divider such that the first portion of each of the pair of brackets is held secure in the recess of the frame member. The divider spans across the upper periphery of the terrarium and is secured to the frame member at two opposite locations. The top member also includes a pair of covers which are secured between the frame member and the divider. The pair of covers allow for the passage of air into and out of the terrarium. Lastly, the top member includes a pair of attachment members each surrounding one of the pair of covers. One of the pair of attachment members engages the first channel and the second channel, and the other of the pair of attachment members engages the first channel and the third channel to hold the pair of covers secure.

In another embodiment, the top member includes a plurality of frame members positioned around an upper periphery of the terrarium. At least two of the plurality of frame members are aligned opposite to one another. Each of the plurality of frame members is secured to an adjacent frame member by a connecting bracket. Each of the plurality of frame members has a top wall joined by a sidewall to a bottom wall. The top wall has an inner edge with a first channel formed adjacent thereto. The first channel has a back wall and has an inwardly facing opening. The frame member also has a first wall extending downward toward the bottom wall. The first wall and the back wall create a recess therebetween. The top member also includes a divider having an upper wall with first and second side edges, a pair of sidewalls extending downward from the upper wall, and each of the pair of sidewalls is spaced inward from one of the first and second side edges. The divider also has a pair of lower walls extending outward from the pair of sidewalls. Each of the pair of lower walls cooperates with the top wall and the pair of sidewalls to create a second channel and a third channel. Each of the second and third channels has an outwardly facing opening. The top member further includes a pair of brackets each having a first portion and a second portion joined together by a fourth channel. Each of the pair of brackets also has first and second sides and the fourth channel extends between the first and second sides. The first portion of each of the pair of brackets is sized to fit in the recess of the two oppositely aligned frame members. Fasteners are used to secure the second portion of each of the pair of brackets to the divider such that the first portion of each of the pair of brackets is held secure in the recess of the two oppositely aligned frame members. The top member also includes a pair of covers secured between three of the plurality of frame members and the divider. The pair of covers allow for the passage of air into and out of the terrarium. Lastly, the top member includes a pair of attachment members each surrounding one of the pair of covers. One of the pair of attachment members engages the first channel of three of the frame members and the second channel of the divider. The other of the pair of attachment members engages the first channel of three of the frame members and the third channel of the divider to hold the pair of covers secure.

This invention also relates to a terrarium which has a front wall, a back wall, a pair of sidewalls and a bottom having a periphery. The front wall, back wall and pair of sidewalls are joined together at their ends and all four walls are secured to the periphery of the bottom to form a terrarium having an upper surface and an upper periphery. A top member closed off the upper surface of the terrarium. The top member includes a frame member positioned around the upper periphery of the terrarium. The frame member has a top wall joined by a sidewall to a bottom wall. The top wall has an inner edge with a first channel formed adjacent thereto. The first channel has a back wall and has an inwardly facing opening. The frame member also has a first wall extending downward toward the bottom wall. The first wall and the back wall create a recess therebetween. The top member also includes a divider having an upper wall with first and second side edges, a pair of sidewalls extending downward from the top wall, and each of the pair of sidewalls being spaced inward from one of the first and second side edges. The divider also has a pair of lower walls extending outward from the pair of sidewalls. Each of the pair of lower walls cooperates with the top wall and the pair of sidewalls to create a second channel and a third channel. Each of the second and third channels has an outwardly facing opening. The top member further includes a pair of brackets each having a first portion and a second portion joined together by a fourth channel. Each of the pair of brackets also has a first side and a second side and the fourth channel extends between the first and second sides. The first portion of each of the pair of brackets is sized to fit in the recess of the frame member. Fasteners are used to secure the second portion of each of the pair of brackets to the divider such that the first portion of each of the pair of brackets is held secure in the recess of the frame member. The divider spans across the upper periphery of the terrarium and is secured to the frame member at two opposite locations. The top member also has a pair of covers secured between the frame member and the divider which allow for the passage of air into and out of the terrarium. Lastly, the top member includes a pair of attachment members each surrounding one of the pair of covers. One of the pair of attachment members engages the first channel and the second channel, and the other of the pair of attachment members engages the first channel and the third channel to hold the pair of covers secure.

The general object of this invention is to provide a top member for a terrarium and the terrarium itself. A more specific object of this invention is to provide a top member for a terrarium which cannot be pushed upward.

Another object of this invention is to provide a top member for a terrarium which will provide good ventilation.

A further object of this invention is to provide a top member for a terrarium which is easy to assembly and inexpensive to manufacture.

Still another object of this invention is to provide a top member for a terrarium which will prevent a reptile, such as a snake, from escaping from the terrarium.

Still further, an object of this invention is to provide a terrarium which is aesthetically pleasing to look at.

Other objects and advantages of the present invention will become more apparent to those skilled in the art in view of the following description and the accompanying drawings.

DETAILED DESCRIPTION OF THE INVENTION

Figure 1:
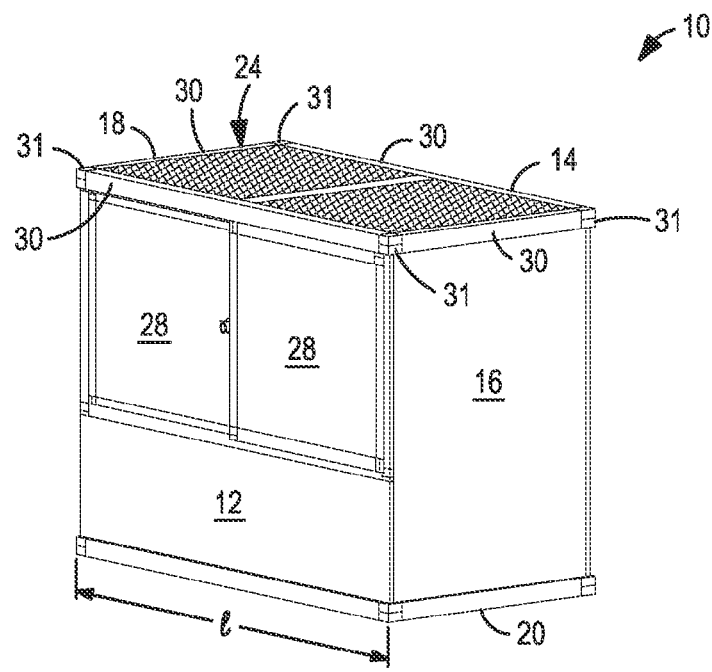
FIG. 1 is a perspective view of a terrarium.
Figure 2:
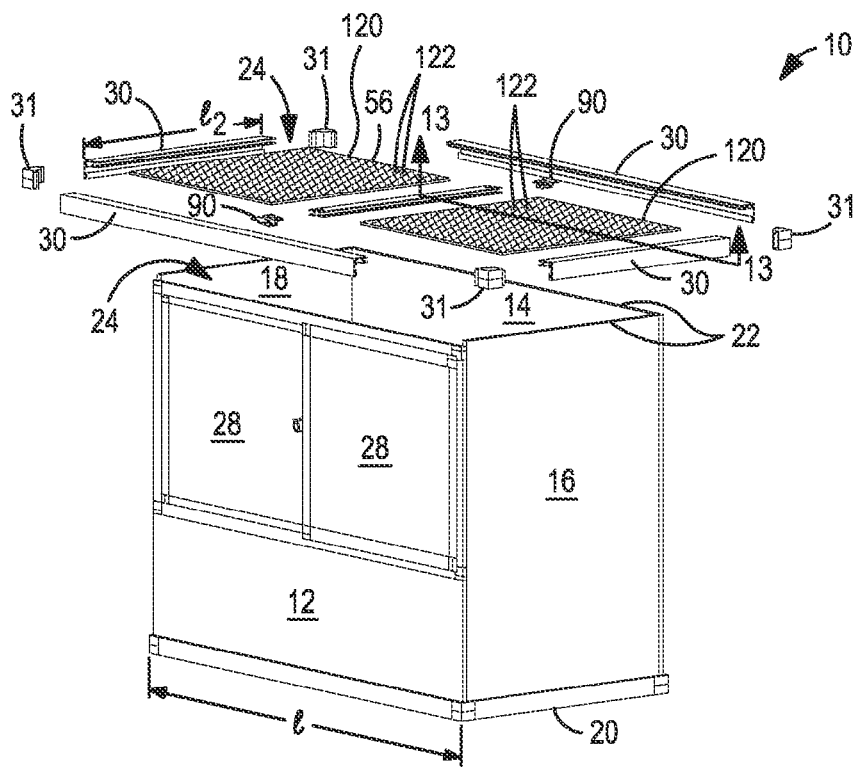
FIG. 2 is an exploded view of FIG. 1 showing the components forming the top member.

Referring to FIGS. 1 and 2, a terrarium 10 is shown. By "terrarium" it is mean an enclosure or closed container in which selected living small land animals, especially reptiles, such as frogs, turtles, snakes, etc. can be kept. By "reptile" it is meant any of various cold-blooded, usually egg-laying vertebrates of the class Reptilia, such as a snake or turtle, having an external covering of scales or horny plates and breathing by means of lungs. Other exotic animals can also be housed in the terrarium 10. By "exotic" it is meant intriguingly unusual or different.

The terrarium 10 is depicted as having a rectangular, three dimensional configuration, although it could also have various shapes including but not limited to: a polygon, a triangular shape, a pentagon shape, a hexagonal shape, etc. or any variation thereof. The terrarium 10 has a front wall 12, a back wall 14, a pair of sidewalls 16 and 18, and a bottom 20. The front wall 12, back wall 14 and the pair of sidewalls 16 and 18 are joined together at their ends and all four walls 12, 14, 16 and 18 are secured to the periphery of the bottom 20 to form a hollow container or housing.

Referring to FIG. 2, the terrarium 10 has an upper periphery 22 and an open top 24 which is intended to be closed off by a top member 26.

The terrarium 10 can vary in size, shape, design, configuration and materials from which it is constructed. The terrarium 10 can be constructed out of various materials, including but not limited to: wood, metal, a metal alloy, plastic, a thermoplastic, a composite material, fiberglass, glass, clear glass, tinted glass, PLEXIGLAS, one or more sheets of acrylic, a transparent material, a non-transparent material, a solid material, etc. PLEXIGLAS is a registered trademark of Rohm and Hass Company having an office at Independence Mall, West Philadelphia, Pa. 19105. PLEXIGLAS is a light transparent, weather-resistant thermoplastic. By "a sheet of acrylic" it is meant a sheet formed from acrylic resin. Desirably, the terrarium 10 is formed from glass, PLEXIGLAS or acrylic.

It should be understood that one wall of the terrarium 10 could be constructed of glass while a second wall is constructed of aluminum or a composite material. Various materials are utilized to form the terrarium 10 so as to increase air ventilation, provide appropriate lighting, provide openings for heat lamps, wires, etc. Certain materials are more easily drilled or punched to provide openings in desired locations.

It should also be understood that the top member 26 could be fitted to an existing aquarium formed from glass, PLEXIGLA, or some other material. When the top member 26 is utilized with an existing aquarium, it can be secured in place using a strong adhesive, a double side adhesive, silicone, or a mechanical fastener(s). The mechanical fastener(s) could be any mechanical fastener known to those skilled in the art including but not limited to: nuts and bolts, screws, rivets, clamps, interlocking members, etc. When the top member 26 is secured to an existing aquarium, the aquarium is instantly transformed into a terrarium.

Still referring to FIGS. 1 and 2, the terrarium 10 can have at least one door 28 positioned in the front wall 12. The door 28 is not mandatory but is very useful. The door 28 can vary in design. The at least one door 28 can be a sliding door, a hinged door that can swing between an open and a closed position, a hung door, etc. A pair of sliding doors 28, 28 is shown in FIGS. 1 and 2. The at least one door 28 is located above a portion of the front wall 12. This design permits a lower portion of the interior of the terrarium 10 to have both a dry area and a wet area (not shown). A dry area is an area free of water and a wet area contains water. Certain reptiles require both water and land to survive. For example, a turtle may spends a fair amount of its waking hours in the water but still needs to breath fresh air. When resting, the turtle may wish to move to the dry area or to a log which extends out of the water.

The sliding doors 28, 28 provide ingress and egress to and from the terrarium 10. By "ingress" it is meant an opening for going in or place of entry. By "egress" it is meant an opening for going out or an exit. Various objects can be inserted into the terrarium 10 through the sliding doors 28, 28, including but not limited to logs, rocks, dirt, plants, food, water, etc. as well as providing an entrance and exit for the reptile itself. The sliding doors 28, 28 are of sufficient size to enable the owner or caretaker of the animal to easily reach inside so as to periodically clean the interior of the terrarium 10. The objects, such as logs, rocks and plants create an aquatic scene which replicates the environment in which the reptiles are normally found in nature. Many terrarium owners relish the ability to create their own unique aquatic scene.

It should be understood that the sliding doors 28, 28 could be positioned over the open top 24, if desired. When the open top 24 is closed by the sliding doors 28, 28, the construction of a frame member 30, in which the sliding doors 28, 28 can slide, can be configured to accommodate the sliding doors 28.

Still referring to FIGS. 1 and 2, the terrarium 10 is depicted as a large receptacle which may span two or more feet in length. The size of the terrarium 10 can vary depending on the kind or type of exotic animal or the number of exotic animals to be housed therein.

The front wall 12 of the terrarium 10 can have a length l which can range from between about 2 feet to about 20 feet. Desirably, the front wall 12 of the terrarium 10 can have a length l which is 3 feet or longer. More desirably, the front wall 12 of the terrarium 10 can have a length l which is 4 feet or longer. Most desirably, the front wall 12 of the terrarium 10 can have a length l which is 5 feet or longer.

Still referring to FIGS. 1 and 2, the open top 24 of the terrarium 10 is designed to be closed so that the exotic animal cannot escape. Some reptiles, such as large snakes, can climb and can exert substantial pressure against the top member 26. If the top member 26 is not securely affixed to the terrarium 10, the reptile could escape. To prevent this from occurring, the top member 26 is constructed in such a fashion that it is impossible for a reptile to force it open.

It should be understood that even though the invention refers to a top member 26 for an existing terrarium 10, as well as a new terrarium 10, the top member 26 could also be used on or incorporated into other types of structures that could benefit from having a closed upper surface. Such structures include but are not limited to: tanks, containers, box containers, receptacles, housings, enclosures, box type housings, packaging binds, etc.

Figure 3:
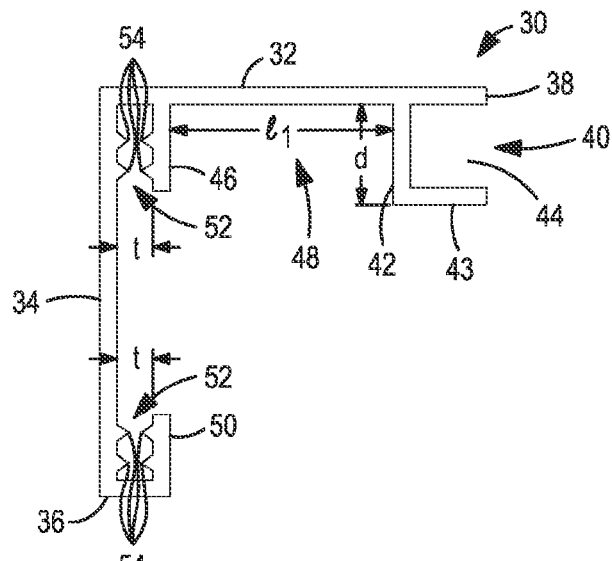
FIG. 3 is an end view of a frame member.

Referring now to FIG. 3, the top member 26 includes several components. The top member 26 includes a frame member 30 positioned around and secured to the upper periphery 22 of the terrarium 10. Four frame members 30, 30, 30 and 30 are shown in FIGS. 1 and 2, since the terrarium 10 has a rectangular shape. However, a cylindrical terrarium 10 could have a single circular frame member 30. Likewise, a polygonal shaped terrarium 10, with three or more sidewalls, will utilize a plurality of frame members 30. Two or more frame members 30, 30 can be secured together using a bracket 31. The bracket 31 can vary in size, shape and design. The bracket 31 can be a corner bracket, as depicted, which can be used to attach two frame members 30, 30 together at an angle. Alternatively, the bracket 31 could be a connecting bracket which can connect two frame members 30, 30 together in a straight line. Those skilled in the art are well aware of different kinds and types of brackets 31 that can be used.

The frame member(s) 30 can be formed from various materials, including but not limited to: aluminum, plastic, thermoplastic, a composite material, metal, a metal alloy, wood, fiberglass, etc. Aluminum and plastic are the two most commonly used materials from which the frame member 30 is constructed. The frame member(s) 30 can be secured to the upper periphery 22 of the terrarium 10 in a variety of ways well known to those skilled in the art. Typically, the frame member(s) 30 are secured in place by using an adhesive, glue, a chemical bond, a mechanical fastener, or a combination of one or more such devices.

In a rectangular shaped terrarium 10, at least two frame members 30, 30, or at least a portion of two frame members 30, 30 can be aligned opposite to one another. By "aligned opposite" it is meant that the frame members 30, 30 or a portion thereof, are placed or located across from one another. For odd shaped terrariums 10, the frame members 30, 30 may not be aligned opposite to one another.

The frame member 30 has a length. The length of the frame member 30 can vary. When more than one frame member 30 is present, the frame member 30, 30 can be of a different length or they can be of the same length.

Referring again to FIG. 3, each frame member 30 has a top wall 32 joined by a sidewall 34 to a bottom wall 36. The top wall 32 has an inner edge 38 with a first channel 40 formed adjacent thereto. By "channel" it is meant a course or passage into which another member can engage. The first channel 40 has a back wall 42, a lower wall 43, and has an inwardly facing opening 44. The lower wall 43 can be aligned horizontally. The lower wall 43 can be aligned parallel to the top wall 32. In addition, the lower wall 43 can be aligned perpendicular to the back wall 42.

The frame member 30 also has a first wall 46 which extends downward from the top wall 32 toward the bottom wall 36. The first wall 46 can be integrally formed with the top wall 32 or be secured thereto. Desirably, the first wall 46 is integrally formed with the top wall 32. By "integrally formed" it is meant a complete unit; a whole. The back wall 42 of the first channel 40 and the first wall 46 cooperate to form or create a recess 48 therebetween. By "recess" it is meant a cavity or small hollow. The size and shape of the recess 48 can vary.

Typically, the recess 48 has a rectangular configuration, as shown. The recess 48 has a length $l_1$ and a depth d and both can vary in dimension. The length $l_1$ of the recess 48 can be less than about 4 inches. Desirably, the length $l_1$ of the recess 48 is less than about 2 inches. More desirably, the length $l_1$ of the recess 48 is less than about 1.5 inches. Even more desirably, the length $l_1$ of the recess 48 is less than about 1 inch. Most desirably, the length $l_1$ of the recess ranges from between about 0.25 to about 1 inch.

The depth d of the recess 48 can also vary. The depth d of the recess 48 can be about 1 inch or less. Desirably, the depth d of the recess 48 is about 0.5 inches or less. More desirably, the depth d of the recess 48 is about 0.4 inches or less. Even more desirably, the depth d of the recess 48 is about 0.38 inches or less. Most desirably, the depth d of the recess 48 ranges from between about 0.1 inches to about 0.375 inches.

The frame member 30 also has a second wall 50 which extends upward from the bottom wall 36 toward the top wall 32. The second wall 50 can be integrally formed with the bottom wall 36 or be secured thereto. Desirably, the second wall 50 is integrally formed with the bottom wall 36. The first and second walls, 46 and 50 respectively, are spaced apart from the sidewall 34. The first and second walls, 46 and 50 respectively, cooperate with the sidewall 34 to form a pair of passages 52, 52. The pair of passages 52, 52 is sized to receive an associate member (not shown) or a portion thereof, such as an outwardly extending tongue. The associate member could be part of a corner bracket or a connecting bracket which is used to join a frame member 30 to another frame member 30. When the associate member is part of a corner bracket, it will be able to join a frame member 30 at an angle to another frame member 30. When the associate member is part of a connecting bracket, it will be able to join two frame members 30, 30 together in a straight line.

Still referring to FIG. 3, each of the pair of passages 52, 52 has a thickness t. The thickness t of each passage 52 can vary in dimension. Desirably, the thickness t of each passage 52 ranges from about 0.05 inches to about 0.25 inches. More desirably, the thickness t of each passage 52 is less than about 0.2 inches. Even more desirably, the thickness t of each passage 52 is less than about 0.15 inches. Most desirably, the thickness t of each passage 52 is about 0.125 inches or less.

The first wall 46 is shown as being vertically spaced apart from the second wall 50. Alternatively, the first and second walls, 46 and 50 respectively, could be joined together to form a single wall. The first and second walls, 46 and 50 respectively, can be coaxially aligned with one another or be slightly offset from one another. Desirably, the first and second walls, 46 and 50 respectively, are coaxially aligned with one another. When the frame member 30 is formed from aluminum, the first and second walls, 46 and 50 respectively, can be aligned parallel or essentially parallel to the sidewall 42. The first and second walls, 46 and 50 respectively, are shown as being aligned parallel to the sidewall 34 in FIG. 3.

Still referring to FIG. 3, two or more spaced apart ribs 54 can be formed on the inner surfaces of the pair of passages 52, 52. The ribs 54 are optional. The ribs 54 can extend longitudinally along the length of the frame member 30. The ribs 54 are spaced apart from one another and are relatively small in size, having a height of less than about 0.15 inches. Desirably, the ribs 54 have a height of less than about 0.1 inches. The ribs 54 can vary in size, shape and design. The ribs 54 can have a pointed or round apex. The ribs 54 function to form a more secure, durable and/or snug fit with an associate member (not shown), such as an outwardly extending tongue on a corner bracket or a connecting bracket. The ribs 54 act as teeth which engage with the outer periphery of a tongue portion of an associate member and can hold the tongue tight and secure. Other ways of ensuring that a tight fit is obtained between the pair of passages 52, 52 and an associated member is to size the pair of passages 52, 52 to create an interference with the associate member. Another option is to use some sort of interlocking mechanism between the pair of passages 52, 52 and the associate member. Still another option is to apply and adhesive, such as glue, into the pair of passages 52, 52 to secure the associate member thereto. These and other ways of obtaining a secure fit are well known to those skilled in the art.

Figure 4:
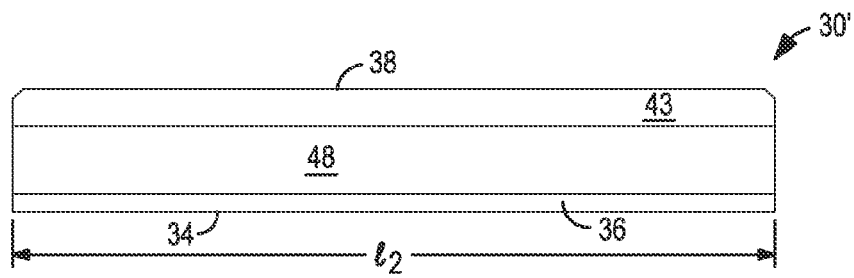
FIG. 4 is a bottom view of a frame member formed from plastic.
Figure 5:
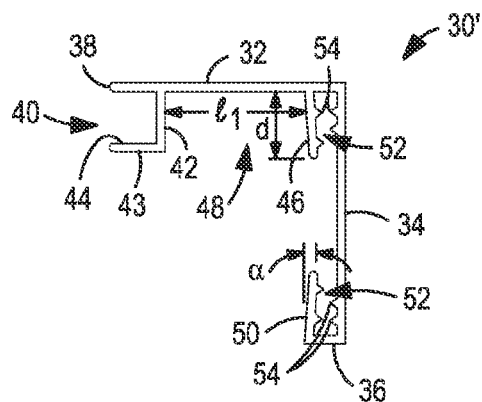
FIG. 5 is an end view of the frame member shown in FIG. 4 depicting the first and second walls slightly inclined relative to the sidewall.

Referring now to FIGS. 4 and 5, an alternative embodiment of a frame member 30' is shown. The frame member 30' is similar to the frame member 30, shown in FIG. 3, except that the first and second walls, 46 and 50 respectively, are inclined inward toward the sidewall 34 at a slight angle. The angle of inclination, alpha ($\alpha$), can range from between about 1 to about 30°. Desirably, the angle of inclination $\alpha$ is less than about 20°. More desirably, the angle of inclination $\alpha$ is less than about 15°. Even more desirably, the angle of inclination $\alpha$ is less than about 10°. Most desirably, the angle of inclination $\alpha$ is less than about 5°. The benefit of inclining the first and second walls, 46 and 50 respectively, slightly inward towards the sidewall 34 is most prevalence when the frame member 30' is formed from plastic. The slight angle of inclination $\alpha$ creates a pressure fit between the frame member 30' and the associate member, or portion thereof, to form a snug fit.

The frame member 30' also has a length $l_2$. The length $l_2$ of the frame member 30' can vary, as was explained above for the frame member 30.

Referring now to FIGS. 6-9, the top member 26 also includes a divider 56. The divider 56 can be formed from a variety of materials. Such materials include but are not limited to: aluminum, metal, a metal alloy, wood, a composite material, fiberglass, plastic, a thermoplastic, etc. Aluminum is the preferred material from which the divider 56 is constructed. The divider 56 has a longitudinal central axis X-X, a vertical central axis Y-Y and a transverse central axis Z-Z. The divider 56 also has a length $l_3$, a width $w_3$ and a height $h_3$, see FIGS. 7 and 9. The length $l_3$, the width $w_3$ and the height $h_3$ of the divider 56 can vary depending upon the size of the terrarium 10 it will be mounted to. The divider 56 is designed to span across the upper periphery 24 or across two oppositely aligned frame members 30, 30 or 30' 30', or portions thereof, and provide structural support between the front wall 12 and the back wall 14 or between the two sidewalls 16 and 18. If the terrarium 10 has six sidewalls, then the divider 56 could be utilized between any two opposing sidewalls. Desirably, the divider 56 is perpendicularly aligned to the two oppositely aligned frame members 30, 30 or 30' 30', or portions thereof.

If the terrarium 10 does not have two oppositely aligned frame members 30, 30 or 30' 30', or portions thereof, the divider 56 could still be utilized but a connecting bracket would have to be used at one or both ends of the divider 56 to form a secure connection.

One or more dividers 56 can be used with each terrarium 10. Generally, a divider 56 should be spaced every 2 feet along the entire length l of the terrarium 10. For example, if the terrarium 10 has a 6 foot length l, then two dividers 56, 56 would be utilized. One divider 56 would be located 2 feet from a first end of the terrarium 10, and the second divider 56 would be located 2 feet from the first divider 56. The divider(s) 56 function to transform the weakest point(s) in the terrarium 10 into the strongest point(s).

Still referring to FIGS. 6-9, the divider 56 has an upper wall 58 with first and second side edges, 60 and 62 respectively, and first and second ends, 64 and 66 respectively. A pair of sidewalls 68 and 70 extends downward from the first and second sides, 60 and 62 respectively, and each of the pair of sidewalls 68 and 70 is spaced inward from one of the first and second side edges, 60 and 62 respectively. A pair of lower walls 72 and 74 extends outward from the pair of sidewalls, 68 and 70 respectively. Desirably, each of the pair of lower walls 72 and 74 are aligned parallel with the upper wall 58. The lower wall 72 has a side edge and the lower wall 74 has a side edge 78. Each of the side edges, 76 and 78, are vertically aligned with one of the first and second side edges, 60 and 62 respectively. Each of the pair of lower walls 72 and 74 cooperate with the upper wall 58 and the pair of sidewalls 68 and 70 to create a second channel 80 and a third channel 82. Each of the second and third channels, 80 and 82 respectively, has an outwardly facing opening 84 and 86 respectively.

Figure 6:
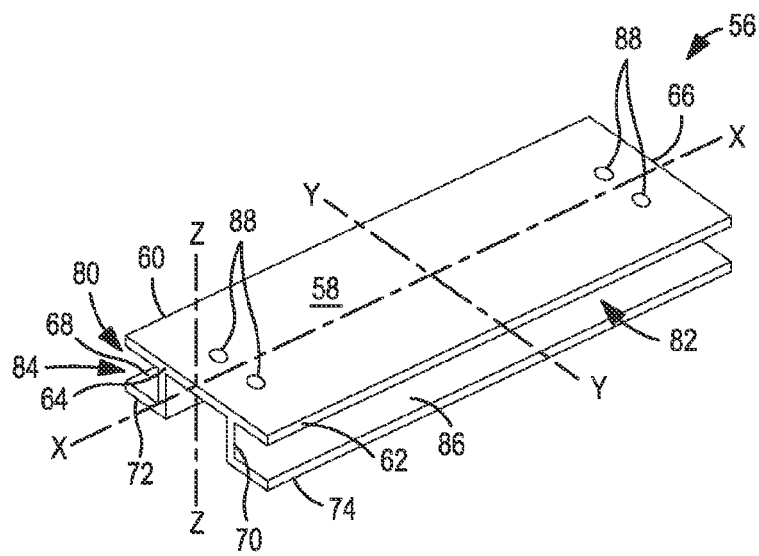
FIG. 6 is a perspective view of a divider.
Figure 7:
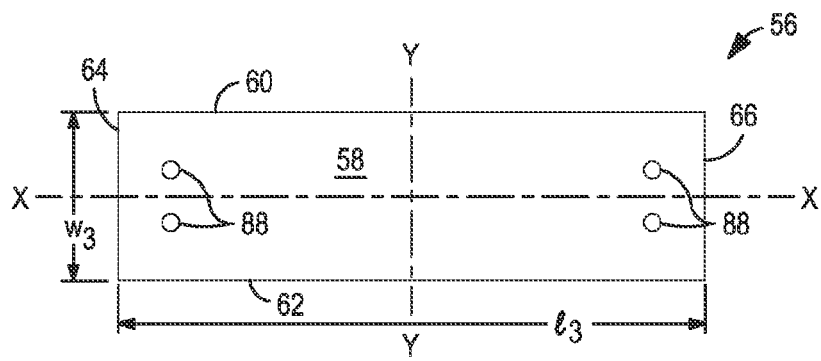
FIG. 7 is a top view of the divider shown in FIG. 6.
Figure 8:
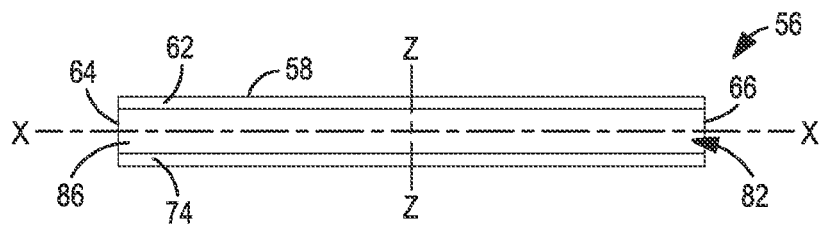
FIG. 8 is a side view of the divider shown in FIG. 7.
Figure 9:
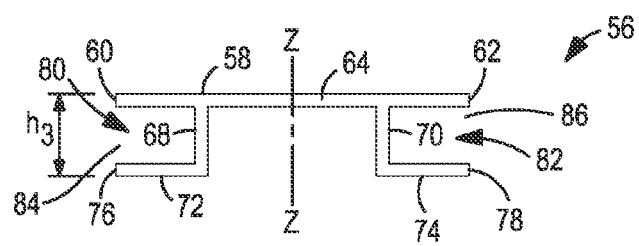
FIG. 9 is an end view of the divider shown in FIG. 6.

Referring again to FIGS. 6 and 7, the divider 56 also has at least two apertures 88, 88 formed through the upper wall 58 with each located adjacent to one of the first and second ends, 64 and 66 respectively. Four apertures 88, 88, 88 and 88 are shown in FIGS. 6 and 7. Two apertures 88, 88 are formed through the upper wall 58 and are located adjacent to the first end 64, and two apertures 88, 88 are formed through the upper wall 58 and are located adjacent to the second end 66. Each of the four apertures 88, 88, 88 and 88 is sized to receive a fastener, as will be explained below.

Figure 10:
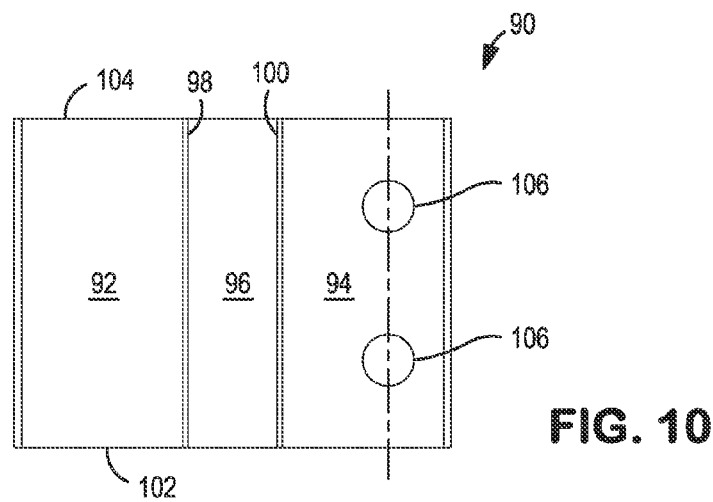
FIG. 10 is a top view of a bracket.
Figure 11:
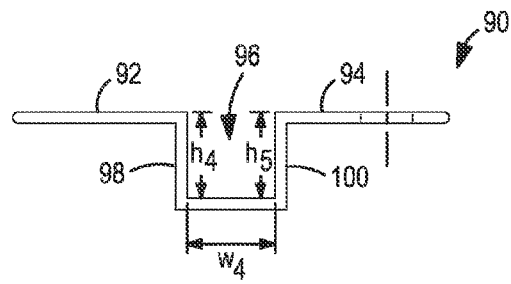
FIG. 11 is a side view of the bracket shown in FIG. 10.

Referring now to FIGS. 10 and 11, the top member 26 further includes a pair of brackets 90, 90. One bracket 90 is shown in FIGS. 10 and 11. Each of the pair of brackets 90, 90 is identical in size and shape. Each of the pair of brackets 90, 90 has a first portion 92 and a second portion 94 joined together by a fourth channel 96. The fourth channel 96 can vary in configuration. The fourth channel 96 can have a rectangular configuration, a square configuration, a U-shape configuration, a C-shape configuration, etc. The fourth channel 96 has a rectangular configuration in FIG. 11. The fourth channel 96 has a first sidewall 98 with a height $h_4$ and a second sidewall 100 with a height $h_5$. The height $h_4$ of the first sidewall 98 is less than the height $h_5$ of the second sidewall 100. This means that the second portion 94 is raised relative to the first portion 92. The fourth channel 96 also has a width $w_4$. The width $w_4$ is shown as having a greater dimension than either the height $h_4$ or the height $h_5$. However, one could construct the pair of brackets 90, 90 such that the width $w_4$ equals the height $h_4$ or the height $h_5$. Alternatively, one could make the width $w_4$ smaller in dimension than either the height $h_4$ or the height $h_5$. The heights $h_4$ and $h_5$, and the width $w_4$ of the fourth channel 96 are sized to receive the back wall 42 and the lower wall 43 of the first channel 40. When the depth d of the recess 48, see FIG. 3, is equal to the height $h_4$ of the first sidewall 98 of the fourth channel 96, the first portion 92 of the bracket 90 will be flush with and in contact with the bottom surface of the recess 48. This is the most preferred alignment. The lower wall 43 of the first channel 40 should have a horizontal dimension that is equal to or is less than the width $w_4$ of the fourth channel 96. Desirably, the lower wall 43 of the first channel 40 will have a dimension that is less than the width $w_4$ of the fourth channel 96.

The height $h_4$ of the fourth channel 96 can vary. The height $h_4$ of the fourth channel 96 can range from between about 0.25 inches to about 0.75 inches. Desirably, the height $h_4$ of the fourth channel 96 is less than about 0.5 inches. More desirably, the height $h_4$ of the fourth channel 96 is less than about 0.45 inches. Even more desirably, the height $h_4$ of the fourth channel 96 is about 0.4375 inches.

The width $w_4$ of the fourth channel 96 can vary. The width $w_4$ of the fourth channel 96 can range from between about 0.25 inches to about 1 inch. Desirably, the width $w_4$ of the fourth channel 96 is less than about 0.8 inches. More desirably, the width $w_4$ of the fourth channel 96 is less than about 0.75 inches. Even more desirably, the width $w_4$ of the fourth channel 96 is about 0.5 inches.

Still referring to FIGS. 10 and 11, each of the pair of brackets 90, 90 also has first side 102 and a second side 104. The fourth channel 96 extends between the first and second sides, 102 and 104 respectively. The fourth channel 96 is aligned perpendicular to the first and second sides, 102 and 104 respectively. The first portion 92 of each of the pair of brackets 90, 90 is sized to fit in the recess 48 of the frame member 30 or 30'. The fourth channel 96 of each of the pair of brackets 90, 90 is sized to receive the back wall 42 and the lower wall 43 of the first channel 40 formed on the frame member 30 or 30'.

The second portion 94 of each of the pair of brackets 90, 90 has one or more apertures 106 formed therethrough. Two apertures 106, 106 are depicted in FIG. 10. The two apertures 106, 106 are sized to receive a fastener 108, as will be explained below. The two apertures 106, 106 will be vertically aligned with the apertures 88, 88 formed in the divider 60, and should be of similar size, if not identical in size. When each of the pair of brackets 90, 90 is mated with a frame member 30 or 30' and with one of the first or second ends, 64 or 66 respectively, of the divider 60, the two apertures 106, 106 will be vertically aligned with the two of the apertures 88, 88 formed through the divider 60.

Figure 12:
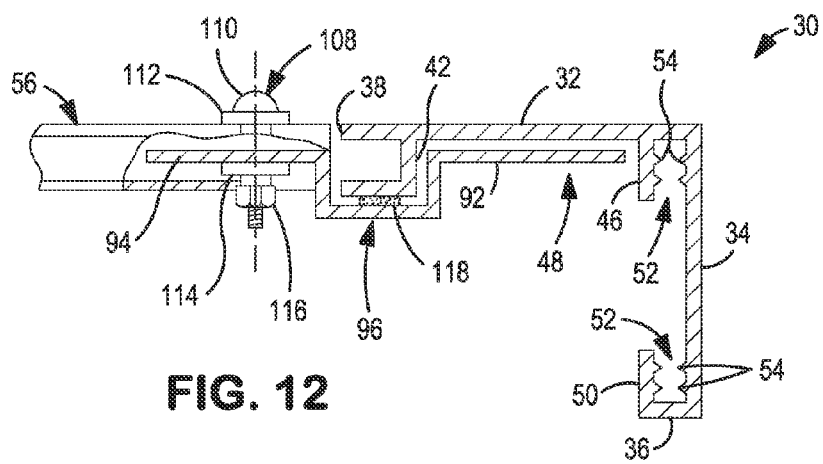
FIG. 12 is a partial cutaway side view of the top member showing the second portion of the bracket secured to the divider by a fastener, and showing the first portion of the bracket positioned in the recess of the frame member.

Referring now to FIG. 12, the frame member 30, the divider 56 and one of the brackets 90 are shown mated together. One or more fasteners 108 are used to secure the second portion 94 of each of the brackets 90, 90 to the divider 56 such that the first portion 92 of each of the pair of brackets 90, 90 is held secure in the recess 48 of each of the two oppositely aligned frame members 36, 36 or 36', 36'. The fasteners 108, 108 are designed and constructed to pass through the apertures 88, 88 formed in the divider 56 and through the apertures 106, 106 formed in the second portion 94 of each of the pair of brackets 90, 90. The fasteners 108, 108 are removable. By "removable" it is meant that the fasteners 108, 108 are of a type that can be tightened to establish a secure attachment and can be later disassembled to be completely removed from the top member 26. The fasteners 108, 108 can be removed when one wants to remove the divider 56 from the terrarium 10.

The fasteners 108, 108 should be capable to being connected together or be disassembled using common tools, such as a screwdriver, pliers, a wrench, an Allen wrench, etc. For example, each of the fasteners 108, 108 can include a screw 110, a first washer 112, a second washer 114 and a nut 116. As depicted in FIG. 12, the first washer 112 is located above the upper wall 58 of the divider 56 and the second washer 114 is located below the upper wall 58 of the divider 56. The nut 116 is threaded onto the screw 110 to form a secure attachment.

The screw 110 can vary in size, shape and construction. For example, the screw 110 can be a machine screw. The head, shank and threads on the screw 110 can also vary. The head of the screw 110 can contain a conventional slot which is sized to receive the blade of a screwdriver. Alternatively, the head of the screw 110 can contain a PHILLIPS head. By "PHILLIPS head" it is meant a head having two intersecting perpendicular slots which is designed to receive the tip of a screwdriver shaped to fit into the slots. PHILLIPS is a registered trademark of Phillips Screw Company having an office at One Van De Graaff Drive, Suite 404, Burlington, Mass. 01803. Likewise, the head of the screw 110 could contain a hexagonal shaped cavity which is sized to receive an Allen wrench. Those skilled in the art will be aware of other head configurations that can be formed on the screw 110.

Likewise, the washers 112 and 114 can vary in size, shape and construction, as well as the number that are used. Even though two washers, 112 and 114, are depicted in FIG. 12, one may use only one washer or no washers. The washers 112 and 114 can be standard washers, flat washers, lock washer, etc. Any combination of such washers can also be used. For example, a flat washer can be positioned on top of the divider 56 and a lock washer can be positioned on the bottom of the divider 56. Those skilled in the art will be aware of various washers 112 and 114 which can be utilized.

The nut 116 can also vary in size, shape and construction. The nut 116 can have a hexagonal shape, a square shape, etc. Those skilled in the art will be aware of various nuts 116 that can be utilized.

As mentioned above, the threads on the screw 110 can also vary. By "thread" it is meant a helical or spiral ridge on the screw 110. The threads can be fine threads, medium threads or coarse threads. Desirably, the threads are medium or fine threads. The spacing between the helical or spiral ridges can also vary. The various types of threads that can be used are well known to those skilled in the art.

Still referring to FIG. 12, even though the fastener 108 is described as including a screw 110, two washers 112 and 114, and a nut 116, other kinds and types of fasteners 108 can also be utilized. Those skilled in the fastener arts are well aware of the different options available.

Each fastener 108 can extend through one of the apertures 88, 88 formed in each of the first and second ends, 64 and 66 respectively, of the divider 56, and through one of the apertures 106, 106 formed in the second portion 94 of the bracket 90. The threaded end of the screw 110 will receive the nut 116. The nut 116 on each screw 110 can be tightened to secure the bracket 90 to the divider 56 and to also retain the first portion 92 of each of the pair of brackets 90, 90 in the recess 48.

Still referring to FIG. 12, one will notice that a piece of adhesive tape 118 can be utilized to temporarily hold the bracket 90 to the divider 56. The piece of adhesive tape 118 can be a two-sided adhesive tape, such as carpet tape, which is commercially available from several different manufacturers. 3M is one such manufacturer of two-sided adhesive tape. 3M has an office at 3M Corporate Headquarters, 3M Center, St. Paul, Minn. 55144-1000. The adhesive tape 118 can be positioned in the bottom of the fourth channel 90 so that it can contact the lower wall 43 of the first channel 40. The tape 118 is optional but will facilitate alignment of the apertures 88, 88 formed in the divider 56 with the apertures 106, 106 formed in the second portion 94 of the bracket 90. Other ways of accomplishing the alignment between the bracket 90 and the divider 56 can also be used. For example, a spot of adhesive, glue, a co-adhesive, etc. could also be used. The piece of tape 118 can remain in place after the fastener 108 secures the second portion 94 of the bracket 90 to the divider 56.

It should be understood that since the frame members 30, 30 or 30', 30' are permanently joined to the upstanding walls 12, 14, 16 and 18 of the terrarium 10, they are stationary members. This means that by nesting or mating the first portion 92 of each of the pair of brackets 90, 90 in the recess 48 of the adjacent frame member 30 or 30', a secure attachment can be obtained. The first portion 92 of the bracket 90 will be locked into the recess 48 by the engagement of the back wall 42 and the lower wall 43 with the fourth channel 96. The fasteners 108, 108 will prevent each of the pair of brackets 90, 90 from separating from the divider 56. When the top member 26 is attached, the upper wall 58 of the divider 56 should be aligned flush with the top walls 32, 32 of the two oppositely aligned frame members 30, 30 or 30' 30'.

Figure 13:
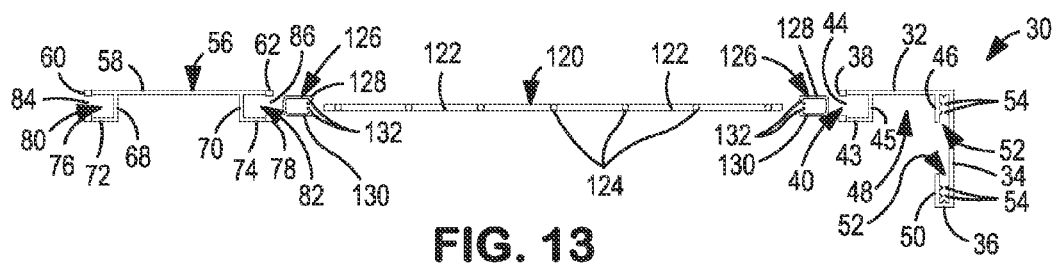
FIG. 13 is an exploded view of taken along line 13-13 of FIG. 2.

Referring now to FIG. 13, the top member 26 further includes a pair of covers 120, 120 secured between the frame member 30 or 30' and the divider 56 which allow for the passage of air into and out of the terrarium 10. It is important that fresh air can enter and exit the terrarium 10 so that the reptiles or animals housed in the terrarium 10 have fresh air to breath. The covers 120, 120 contain a plurality of openings 122. The size, shape, spacing, number and arrangement of the openings 122 can vary. The pair of covers 120, 120 can be formed from different materials. The pair of covers 120, 120 can be formed from a mesh material. By "mesh" it is meant any of the open spaces in a net or network; an interstice. The pair of covers 120,120 can also be constructed from a breathable fabric. By "breathable" it is meant permitting air to pass through. The pair of covers 120,120 can further be constructed from a screen material, from a wire mesh, or my arranging metal wires or rods in a screen like pattern. Furthermore, the pair of covers 120,120 can be constructed from a solid material that has one or more openings 122 formed there through. The openings 122 should be relatively small so that the reptile or animal housed in the terrarium 10 cannot escape through one of the openings 122.

In FIG. 13, each of the pair of covers 120, 120 is constructed from a plurality of fine wire 124 arranged in a crisscross pattern, such as a screen. The openings 122 are present between the crisscross wires 124, 124, 124 and 124.

Still referring to FIG. 13, the top member 26 further includes a pair of attachment members 126, 126. Each of said pair of attachment members 126, 126 has a generally C or U-shaped configuration with a first leg 128 and a second leg 130. The first leg 128 is aligned essentially parallel with the second leg 130 and is spaced apart therefrom. The first and second legs, 128 and 130 respectively, are of the same length although they could be made to a different length, if desired. Each of the first and second legs, 128 and 130 respectively, contain an inwardly directed barb 132. By "barb" it is meant a sharp point projecting in a reverse direction to the main point of a device, as on a fish hook. The barbs 132, 132 can be formed or attached to the terminal end of each of the first and second legs, 128 and 130 respectively, as depicted. Alternatively, the barbs 132, 132 can be located inward from the terminal ends of the first and second legs, 128 and 130 respectively. Each of the pair of attachment members 126, 126 contains two barbs 132, 132. Both of the barbs 132, 132 are aligned approximately opposite to one another and both point inward into the C or U-shaped configuration. The two barbs 132, 132 act as teeth in gripping the periphery of the cover 120 and holding it snug and taut to the frame member 30 or 30' and to the divider 56.

The pair of attachment members 126, 126 can be constructed from various materials. For example, the pair of attachment members 126, 126 can be constructed from plastic, metal, a metal alloy, a thermoplastic, a composite material, etc. Each of the pair of attachment members 126, 126 is designed to engage with the first channel 40 formed in the frame member 30 or 30' and with one of the second or third channels, 80 or 82 respectively, of the divider 56. Each of the pair of attachment members 126, 126 surrounds the periphery of one of the pair of covers 120, 120. One of the pair of attachment members 126 engages the first channel 40 of the frame member 30 or 30', as well as the second channel 80 of the divider 56 to hold the one of the pair of covers 120, 120 secure. The other attachment member 126 engages the first channel 40 of the frame member 30 or 30', as well as the third channel 82 of the divider 56 to hold the other one of the pair of covers 120, 120 secure.

While the invention has been described in conjunction with several specific embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

I claim:

1. A top member for a terrarium, comprising;
   a) a frame member positioned around an upper periphery of a terrarium, said frame member haying a top wall joined by a sidewall to a bottom wall, said top wall having an inner edge with a first channel formed adjacent thereto, said first channel having a back wall and has an inwardly facing opening, said frame member having a first wall extending downward toward said bottom wall, and said first wall and said back wall creating a recess there between;
   b) a divider having an upper wall with first and second side edges, a pair of sidewalls extending downward from said upper wall and each of said pair of sidewalls being spaced inward from one of said first and second side edges, and a pair of lower walls extending outward from said pair of sidewalls, each of said pair of lower walls cooperating with said upper wall and said pair of sidewalls to create a second channel and a third channel, and each of said second and third channels having an outwardly facing opening;
   c) a pair of brackets each having a first portion and a second portion joined together by a fourth channel, each of said pair of brackets also having a first side and a second side and said fourth channel extends between said first and second sides, and said first portion of each of said pair of brackets is sized to fit in said recess of said frame member;
   d) fasteners for securing said second portion of each of said pair of brackets to said divider such that said first portion of each of said pair of brackets is held secure in said recess of said frame member, and said divider spans across said upper periphery of said terrarium and is secured to said frame member at two opposite locations;
   e) a pair of covers secured between said frame member and said divider, each of said pair of covers allowing for the passage of air into and out of said terrarium; and
   f) a pair of attachment members each surrounding one of said pair of covers, one of said pair of attachment members engaging said first channel and said second channel and said other of said pair of attachment members engaging said first channel and said third channel to hold said pair of covers secure.

2. The top member of clam 1 wherein said first wall of said frame member is aligned parallel to said sidewall of said frame member.

3. The top member of claim 2 wherein said first wall of said frame member is angled toward said sidewall of said frame member.

4. The top member of claim 1 wherein said second channel is aligned opposite to said third channel.

5. The top member of claim 1 wherein said first, second and third channels are rectangular shaped channels.

6. The. top member of claim 5 wherein each of said pair of attachment members is C-shaped and engages with said first channel and with one of said second or third channels.

7. The top member of claim 6 wherein each C-shaped attachment member has a first leg and a second leg, and each of said first and second legs contain an inwardly directed barb.

8. The top member of claim 7 wherein said inwardly directed barbs contact one of said pair of covers and holds said cover secure to said frame member and to said divider.

9. The top member of claim 1 wherein each of said pair of covers contain a plurality of openings.

10. A top member for a terrarium, comprising;
    a) a plurality of frame members positioned around an upper periphery of a terrarium and at least two of said plurality of frame members are aligned opposite to one another, each of said plurality of frame members being secured to an adjacent frame member by a connecting bracket, each of said plurality of frame members having a top wall joined by a sidewall to a bottom wall, said top wall having an inner edge with a first channel formed adjacent thereto, said first channel having a back wall and has an inwardly facing opening, said frame member having a first wall extending downward toward said bottom wall, and said first wall and said back wall creating a recess therebetween;
    b) a divider having an upper wall with first and second side edges, a pair of sidewalls extending downward from said upper wall and each of said pair of sidewalls being spaced inward from one of said first and second side edges, and a pair of lower walls extending outward from said pair of sidewalls, each of said pair of lower walls cooperating with said upper wall and said pair of sidewalls to create a second channel and a third channel, and each of said second and third channels having an outwardly facing opening;
    c) a pair of brackets each having a first portion and a second portion joined together by a fourth channel, each of said pair of brackets also having first and second sides and said fourth channel extends between said first and, second sides, and said first portion of each of said pair of brackets being sized to fit in said recess of said two oppositely aligned frame members;
    d) fasteners for securing said second portion of each of said pair of brackets to said divider such that said first portion of each of said pair of brackets is held secure in said recess of said two appositely aligned frame member;
    e) a pair of covers secured between three of said plurality of frame members and said divider, each of said pair of covers allowing for the passage of air into and out of said terrarium; and
    f) a pair of attachment members each surrounding one of said pair of covers, one of said pair of attachment members engaging said first channel of three of said frame members and said second channel of said, divider and said other of said pair of attachment members engaging said first channel of three of said frame members and said third channel of said divider to hold said pair of covers secure.

11. The top member of claim 10 wherein said first, second and third channels are rectangular shaped channels.

12. The top member of claim 11 wherein each of said pair of attachment members is C-shaped and engages with said first channel and with one of said second or third channels.

13. The top member of claim 12 wherein each C-shaped attachment member has a first leg and a second leg, and each of said first and second legs contain an inwardly directed barb.

14. The top member of claim 13 wherein said inwardly directed barbs contact one of said pair of covers and holds said cover secure to said frame member and to said divider.

15. The top member of claim 10 wherein each of said pair of covers contain a plurality of openings.

16. A terrarium comprising:
a) a front wall, a back wall, a pair of sidewalls and a bottom having a periphery, said front wall, back wall and pair of sidewalls are joined together at their ends and all four walls are secured to said periphery of said bottom to form a terrarium having an upper surface and an upper periphery; and
b) a top member which closed off said upper surface of said terrarium, said top member including a frame member positioned around said upper periphery, said frame member having top wall joined by a sidewall to a bottom wall, said top wall having an inner edge with a first channel formed adjacent thereto, said first channel having a back wall and has an inwardly facing opening, said frame member having a first wall extending downward toward said bottom wall, and said first wall and said back wall creating a recess therebetween; a divider having a upper wall with first and second side edges, a pair of sidewalls extending downward from said upper wall and each of said pair of sidewalls being spaced inward from one of said first and second side edges, and a pair of lower walls extending outward from said pair of sidewalls, each of said pair of lower walls cooperating with said upper wall and said pair of sidewalls to create a second channel and a third channel, and each of said second and third channels having an outwardly facing opening; a pair of brackets each having a first portion and a second portion joined together by a fourth channel, each of said pair of brackets also having a first side and a second side and said fourth channel extends between said first and second sides, and said first portion of each a said pair of brackets is sized to fit in said recess of said frame member; fasteners for securing said second portion of each of said pair of brackets to said divider such that said first portion of each of said pair of brackets is held secure in said recess of said frame member, and said divider spans across said upper periphery of said terrarium and is secured to said frame member at two opposite locations; a pair of covers secured between said frame member and said divider, each of said pair of covers allowing for the passage of air into and out of said terrarium; and a pair of attachment members each surrounding one of said pair of covers to hold said pair of covers secure, one of said pair of attachment members engaging said first channel and said second channel, and said other of said pair of attachment members engaging said first channel and said third channel.

17. The terrarium of claim 16 wherein a sliding door is positioned in said front wall.

18. The terrarium of claim 16 where said front wall, back wall, and pair of sidewalls are formed of glass, PLEXIGLAS or acrylic.

19. The terrarium of claim 16 further comprising a dry area and a wet area, said dry area is free of water and said wet area contains water.

20. The terrarium of claim 16 wherein each of said pair of covers contain a plurality of openings.

* * * * *